Nov. 1, 1927. 1,647,758
S. G. SWEET
ROTARY FLUID EXPANSION OR INTERNAL COMBUSTION ENGINE
Filed Jan. 29, 1927 2 Sheets-Sheet 2

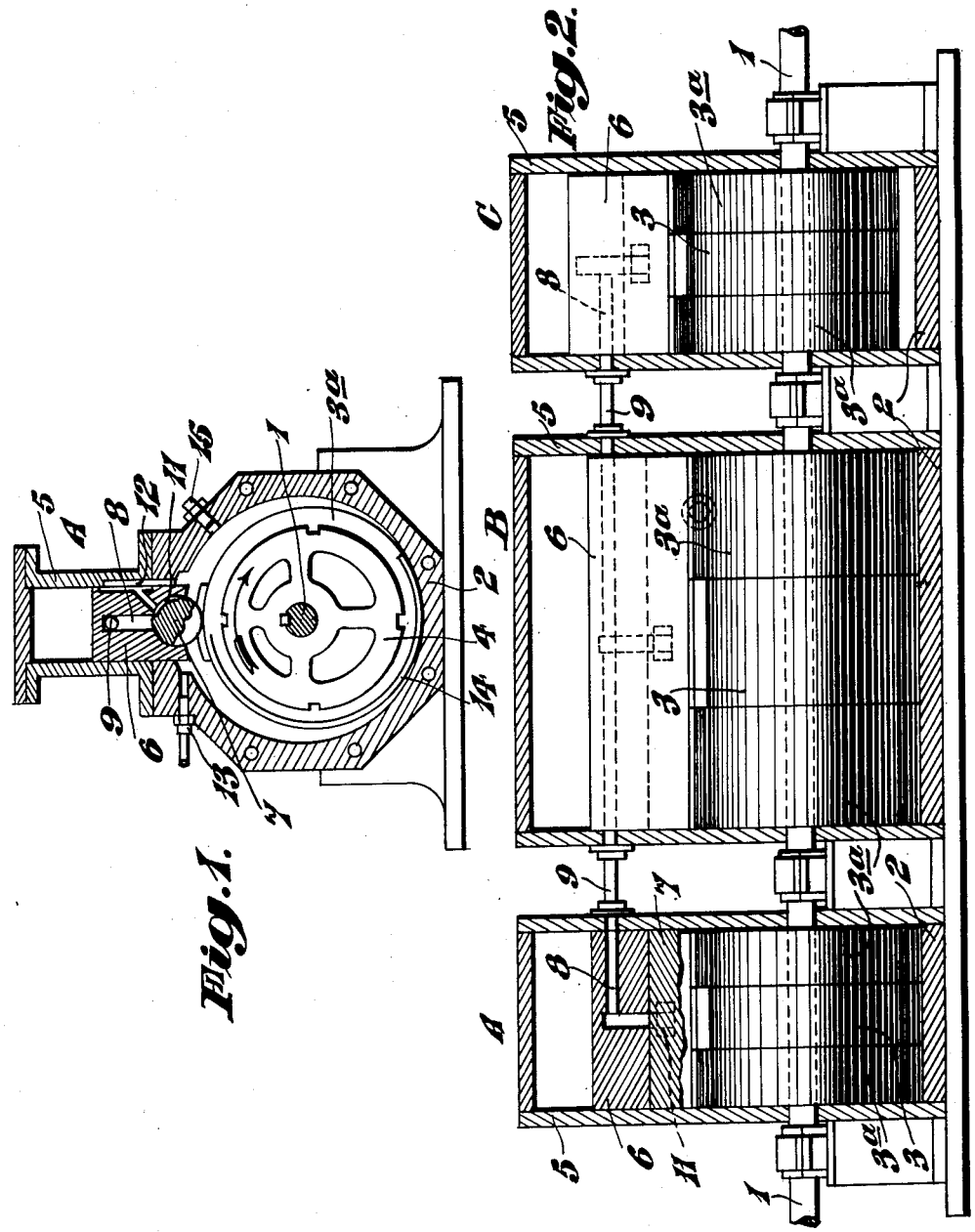

INVENTOR
S. G. Sweet,
by Bright & Bailey
Attys.

Patented Nov. 1, 1927.

1,647,758

UNITED STATES PATENT OFFICE.

SYDNEY GEORGE SWEET, OF CEDARVILLE, EAST GRIQUALAND, SOUTH AFRICA.

ROTARY FLUID-EXPANSION OR INTERNAL-COMBUSTION ENGINE.

Application filed January 29, 1927, Serial No. 164,595, and in Great Britain October 19, 1925.

This invention relates to an improved construction of rotary engine operated by the combustion of a gaseous mixture within the working chamber or chambers, or by the expansion of steam or other fluid. The object of this invention is to provide an improved means of obtaining a rotary action and to provide moving parts which will have very little vibration.

Broadly an engine according to my invention employs a working chamber or chambers each of which is cylindrical or substantially cylindrical, each said chamber accommodating a substantially cylindrical body or structure mounted so that it can oscillate around the interior of said chamber, means being provided for operating an inlet valve in unison with the oscillation of said structure or body for the admission of an expansion fluid or combustible mixture for operating in the space separating the periphery of said body or structure from the walls of the working chamber so as to drive said body or structure around the interior of the working chamber, an outlet passage being provided in said working chamber through which the utilized expansion fluid or combustible mixture is adapted to be swept by the said body or structure, said body or structure being mounted eccentrically upon an axially rotatable shaft.

In carrying this invention into practice, I prefer to employ a series of cylindrical chambers upon a common axis, an axial rotatable shaft passing along such axis through the chambers and carrying eccentrically in each chamber a cylindrical or drum like member the periphery of which engages at one point the inner wall of the cylinder within which it is adapted to move, each such cylindrical or drum like member being adapted to oscillate around the interior of the cylindrical chamber and being connected to a slidable valve member adapted to alternately open and close an inlet port, such slidable valve member if desired also simultaneously operating an exhaust port.

Three cylinders are preferably employed aligned linearly on a common axis and having axial bearings for the support of an axially rotatable shaft. Each cylinder accommodates a smaller diameter annular drum like member within which is concentrically disposed so as to rotate therein a circular member, carried fixedly but eccentrically by the said shaft. Extending radially from each cylinder is a sleeve like extension accommodating slidably a ported valve having at its inner end a pivoted connection to the periphery of the said drum like member. Disposed one on each side of the drum like member but not connected to the slidable valve member are a further pair of similar drum like members supported by the said shaft in the same manner as the member between them. These three drum like members in each cylinder are located on a common axis eccentric to the axis of the said shaft.

In order that this invention may be clearly understood and readily carried into effect I have appended hereto a sheet of drawings diagrammatically illustrating an embodiment of same and wherein:—

Fig. 1 is a sectional elevation, of one working chamber, showing the oscillating body in approximately the middle of its working stroke.

Fig. 2 is a sectional longitudinal elevation showing two working chambers arranged symmetrically either side of a compression or pump chamber.

Figure 3:
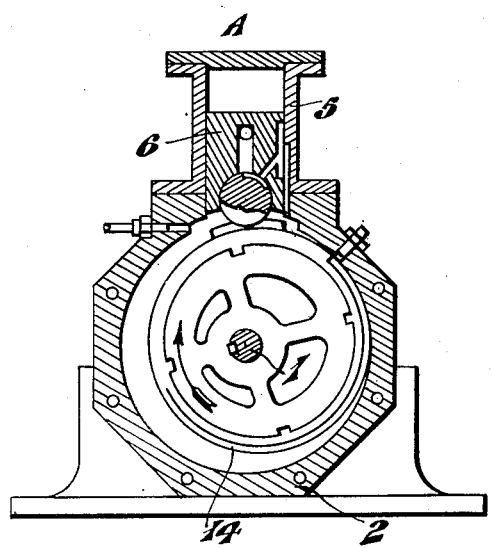
Fig. 3 is a sectional elevation showing the oscillating body at about the commencement of the working stroke.
Figure 4:
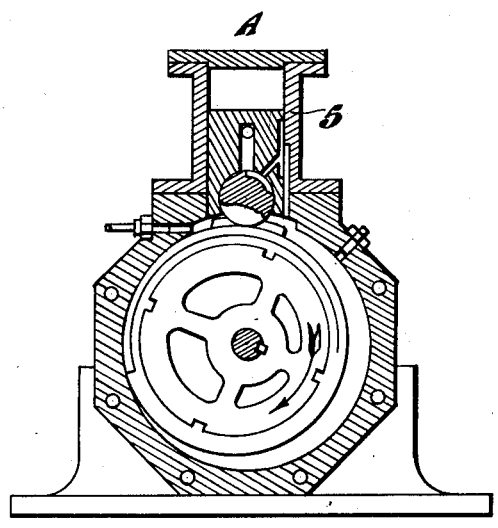
Fig. 4 shows the completion of a working stroke.
Figure 5:
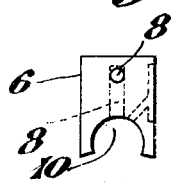
Fig. 5 is an elevation of the slidable valve.
Figure 6:
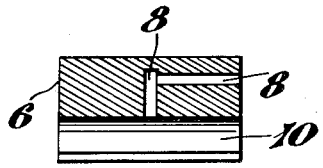
Fig. 6 is a longitudinal section of the valve.
Figure 7:
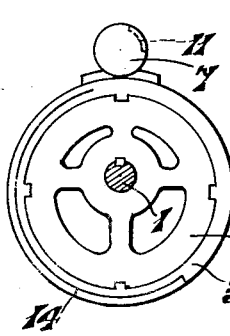
Fig. 7 is an interior elevation view of the oscillating body.
Figure 8:
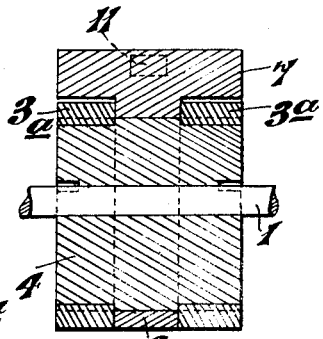
Fig. 8 is a longitudinal section of Fig. 7.
Figure 9:
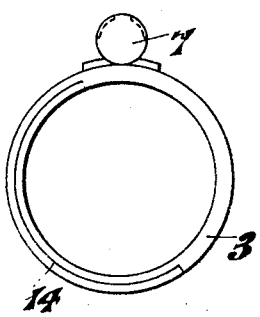
Fig. 9 is an outside elevation of the oscillating body.

Referring to the drawings, three co-operating units A, B, and C are employed aligned linearly on a common axis and having axial bearings for the support of an axially rotatable shaft 1. Each unit comprises a cylinder 2 accommodating a smaller diameter annular drum like member 3 within which is concentrically disposed so as to rotate therein a circular member 4, carried fixedly but eccentrically by the said shaft 1. Extending radially from each cylinder is a sleeve like extension 5 accommodating slidably a ported valve 6 having at its inner end a pivoted connection 7 to the periphery of the said drum like member 3. Disposed one on each side of this drum like member 3 but not connected to the slidable valve member are a further pair of similar drum like members 3ᵃ supported by the said shaft 1 in the same manner as the member between them. These three drum like members in each cylinder are located on a common axis eccentric to the axis of the said shaft 1.

The slidable valve 6 has an inverted L shaped port 8 which establishes communication with an inlet passage 9 from a source of supply (the unit B) and the joint 7 which couples the valve member 6 to the said drum like member 3. The various positions of this joint 7 determines the admission and cutting off of the working fluid to the interior of the cylinder 2. For instance the inner end of the reciprocating valve member may be formed with a circular channel 10 the continuity of which is interrupted on the inner end wall of the member to enable a correspondingly shaped extension (represented by the reference 7) on the drum like member to be slid into position therein. The periphery of this extension 7 is formed with an arcuate channel 11 which in one position of the drum like member establishes communication between the said L shaped port 8 and an inlet passage 12 in the wall of the valve chamber leading to the interior of the cylinder. By this means when the sliding valve member is at the outer end of its stroke the inlet passage is closed but as the member moves towards the cylinder the inlet passage is opened and allows the fluid or gas to enter the cylinder and the fluid or gas becomes compressed initially by the inward movement of the valve between the peripheries of the drum like members 3ᵃ on one side thereof and the wall of the cylinder 2. The expansion or combustion of the fluid or gas will tend to enlarge the small space within which the fluid or gas is compressed and consequently the drum like members will be forced to travel, in an oscillating manner around the cylinder wall until ultimately they contact with a part of the cylinder wall which is diametrically opposite to the part with which they contacted at the end of the inlet stroke. These diametrically opposite parts referred to are in practice in line with the axis of the slidable valve 6 because the valve is at the extreme of its two strokes at these particular moments. Continued movement of the drum like members around the interior of the cylinder will sweep out the burnt gases or other fluid through a passage 13, until the drum like members are again in position to start the cycle of operations.

Each drum like member is preferably split concentrically to its circumference as at 14 for about half its circumference so that it has a certain amount of resiliency in its engagement with the cylinder wall.

In the case of steam being employed the engine may be constructed on the compound principle. It is preferred however to arrange along the shaft, as before-mentioned, three units A, B and C each constructed after the manner hereinbefore described, the centre unit B if desired acting as a pump and serving as a means of compressing the supply of fluid or gas to the other two units, the combustible mixture or other fluid being drawn from a source of supply for instance a carburettor through the equivalent of the inlet passage in the working units A and C, and forced out into the inlets of A and C through the equivalent of the outlet 13 in A and C. For this purpose B must be larger than A and C, as shown in the drawings.

When the engine is an internal combustion engine a timed sparking plug 15 or other simple sparking device may be employed.

What I claim is:—

A rotary engine comprising a cylinder, a shaft extending through said cylinder coaxial therewith, a circular member within said cylinder mounted eccentrically on said shaft, a pair of drum-like members mounted in relative spaced relation concentrically on said circular member for rotation therewith, said drum-like members being adapted for engagement with the wall of said cylinder and being split circumferentially throughout a sufficient portion of their circumferential extent to impart resiliency thereto whereby they engage without jar against said cylinder wall, a third drum-like member mounted on said circular member between said first mentioned pair of drum-like members, said circular member being rotatable with respect to said third drum-like member, a valve, a connection between said valve and said third drum-like member whereby the latter is held against rotation and is caused to oscillate during rotation of said circular member, and means included in said valve and said third drum-like member and in their connection with one another rendered effective by oscillation of said third drum-like member to supply operating fluid at predetermined times to said cylinder to produce rotation of said circular member.

SYDNEY GEORGE SWEET.